United States Patent
Hattori

(10) Patent No.: US 11,603,091 B2
(45) Date of Patent: Mar. 14, 2023

(54) CONTROLLER AND CONTROL METHOD

(71) Applicant: Robert Bosch GmbH, Stuttgart (DE)

(72) Inventor: Takayuki Hattori, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 311 days.

(21) Appl. No.: 17/254,571

(22) PCT Filed: Jun. 14, 2019

(86) PCT No.: PCT/IB2019/054981
§ 371 (c)(1),
(2) Date: Dec. 21, 2020

(87) PCT Pub. No.: WO2020/016675
PCT Pub. Date: Jan. 23, 2020

(65) Prior Publication Data
US 2021/0269016 A1    Sep. 2, 2021

(30) Foreign Application Priority Data

Jun. 21, 2018   (JP) .............................. JP2018-117565

(51) Int. Cl.
*B60W 30/04*      (2006.01)
*B62J 45/20*      (2020.01)

(52) U.S. Cl.
CPC .............. *B60W 30/04* (2013.01); *B62J 45/20* (2020.02); *B60W 2030/041* (2013.01);
(Continued)

(58) Field of Classification Search
CPC .......... B60W 30/04; B60W 2030/041; B60W 2030/043; B60W 2300/36;
(Continued)

(56) References Cited

U.S. PATENT DOCUMENTS

2017/0327004 A1    11/2017   Mochizuki et al.

FOREIGN PATENT DOCUMENTS

| JP | 2013173426 A | 9/2013 |
|---|---|---|
| WO | 2012107829 A1 | 8/2012 |
| WO | 2016016960 A1 | 2/2016 |

OTHER PUBLICATIONS

International Search Report and Written Opinion for Application No. PCT/IB2019/054981 dated Oct. 16, 2019 (9 pages).

*Primary Examiner* — Tyler J Lee
*Assistant Examiner* — Yufeng Zhang
(74) *Attorney, Agent, or Firm* — Michael Best & Friedrich LLP

(57) ABSTRACT

The present invention obtains a controller and a control method capable of appropriately stabilizing a posture of a straddle-type vehicle.
In the controller and the control method according to the present invention, when the straddle-type vehicle jumps, automatic posture control for controlling the posture of the straddle type vehicle by increasing or reducing a rotational frequency of a wheel is executed in accordance with posture information at the time when the straddle-type vehicle jumps. Furthermore, in the case where it is determined whether a driver has intention to control the posture of the straddle-type vehicle at the time when the straddle-type vehicle jumps without relying on the automatic posture control and where it is determined that the driver has the intention, the automatic posture control is prohibited.

12 Claims, 6 Drawing Sheets

(52) U.S. Cl.
CPC ... *B60W 2030/043* (2013.01); *B60W 2300/36* (2013.01); *B60W 2510/0666* (2013.01); *B60W 2510/1005* (2013.01); *B60W 2520/16* (2013.01); *B60W 2520/18* (2013.01); *B60W 2540/10* (2013.01); *B60W 2540/12* (2013.01); *B60W 2540/14* (2013.01); *B60W 2720/28* (2013.01)

(58) Field of Classification Search
CPC . B60W 2510/0666; B60W 2510/1005; B60W 2520/16; B60W 2520/18; B60W 2540/10; B60W 2540/12; B60W 2540/14; B60W 2720/28; B60W 40/11; B62J 45/20; B60T 2230/04; B60T 8/1706
See application file for complete search history.

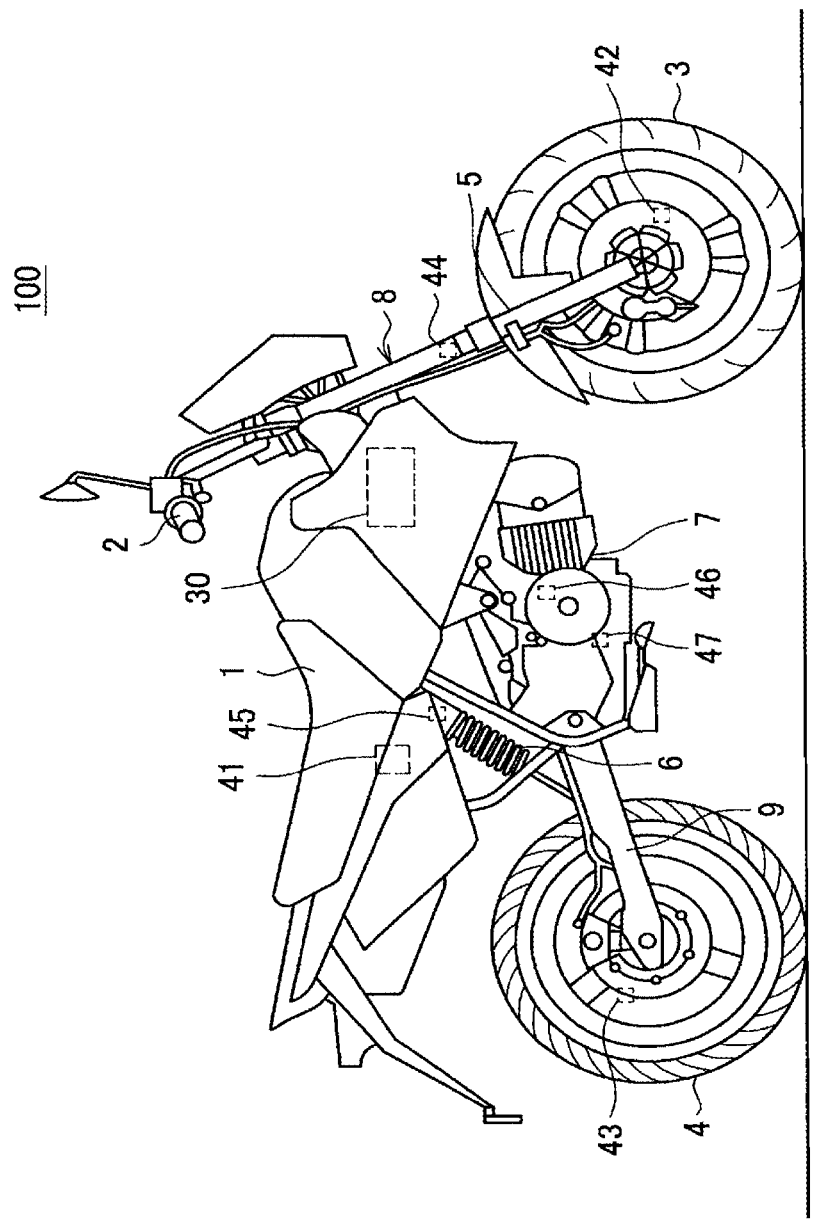
[FIG. 1]

[FIG. 2]
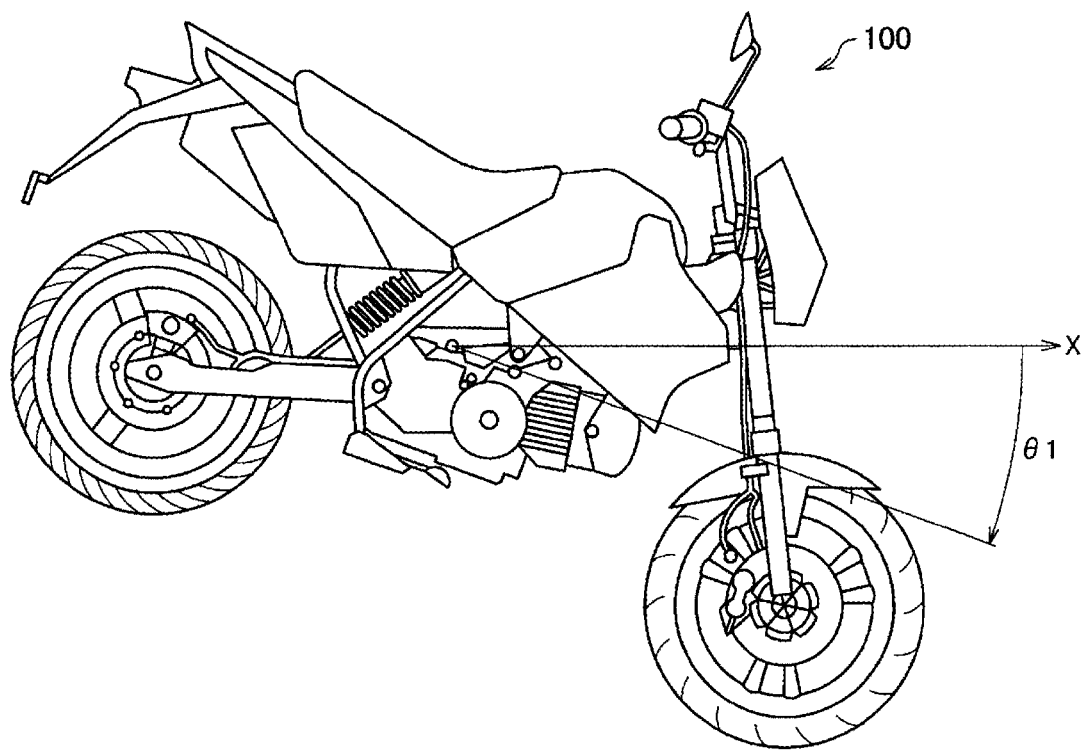

[FIG. 3]
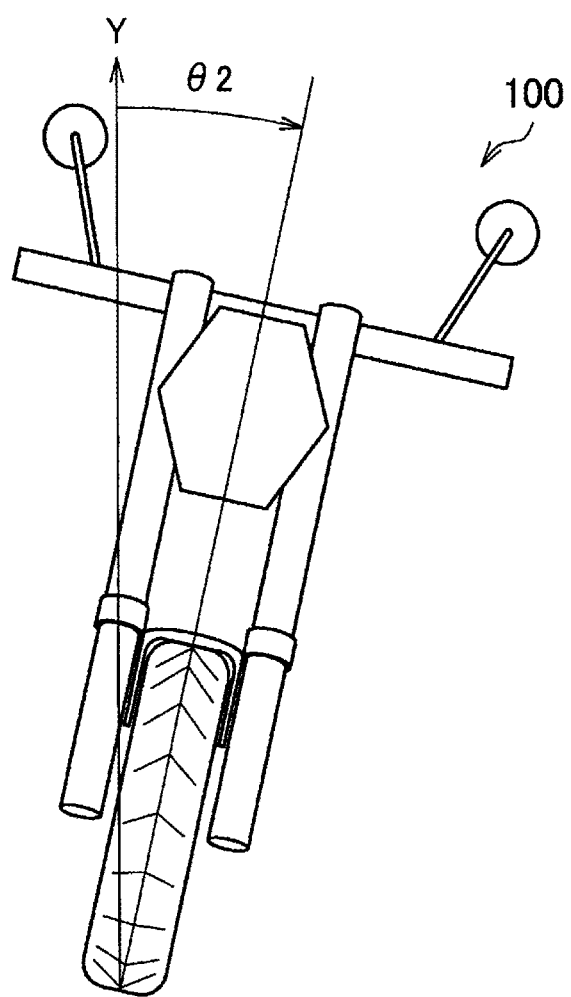

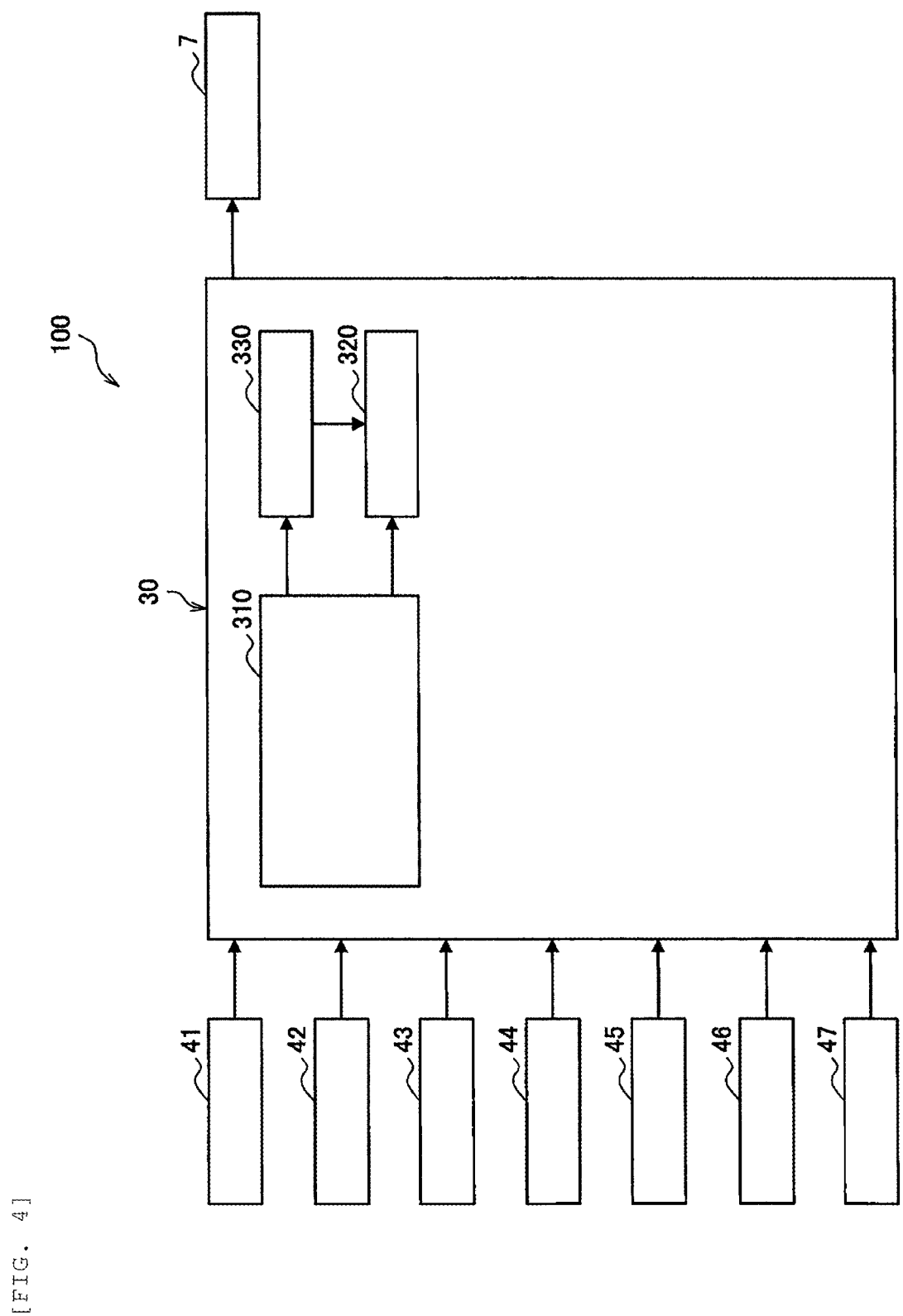

[FIG. 5]
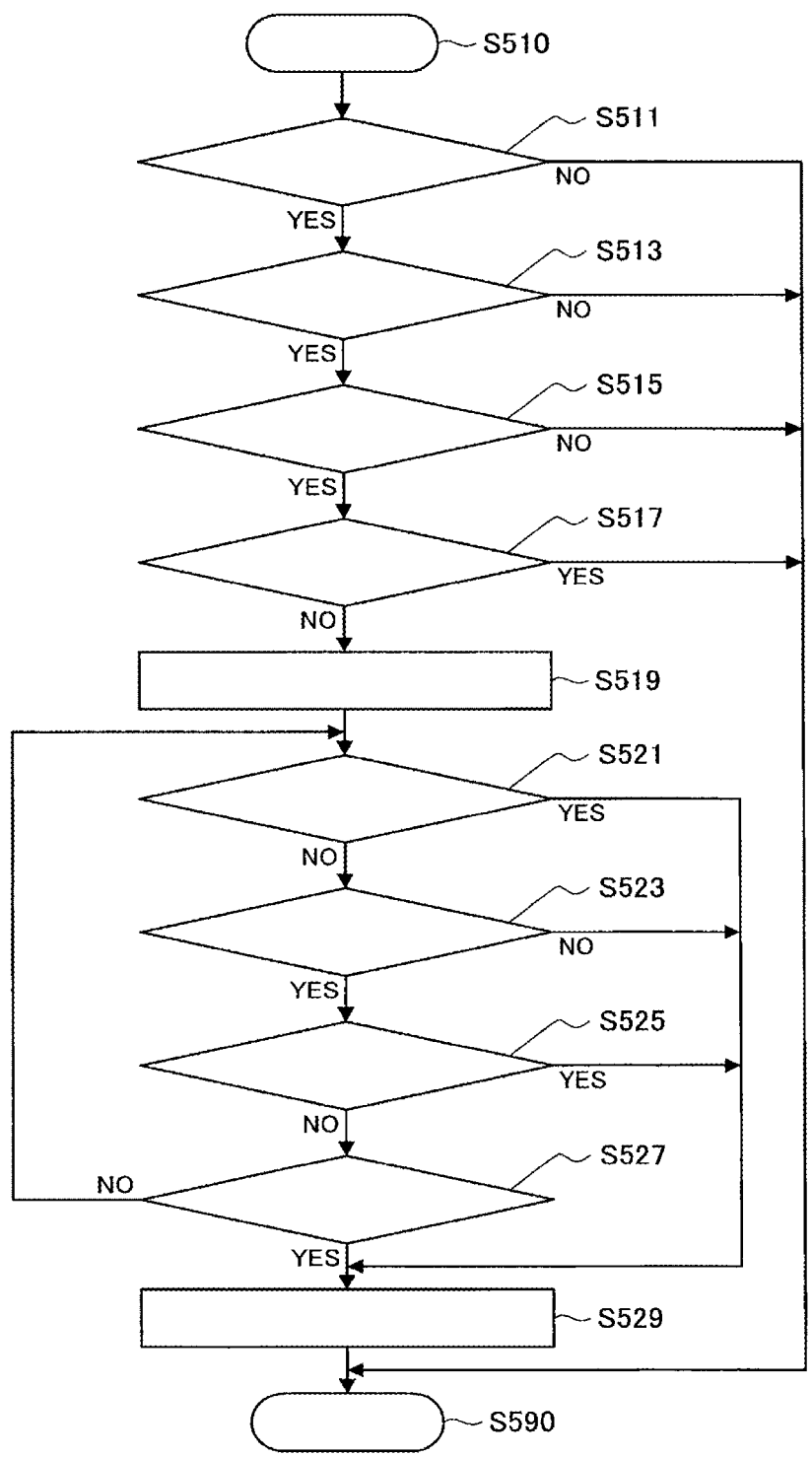

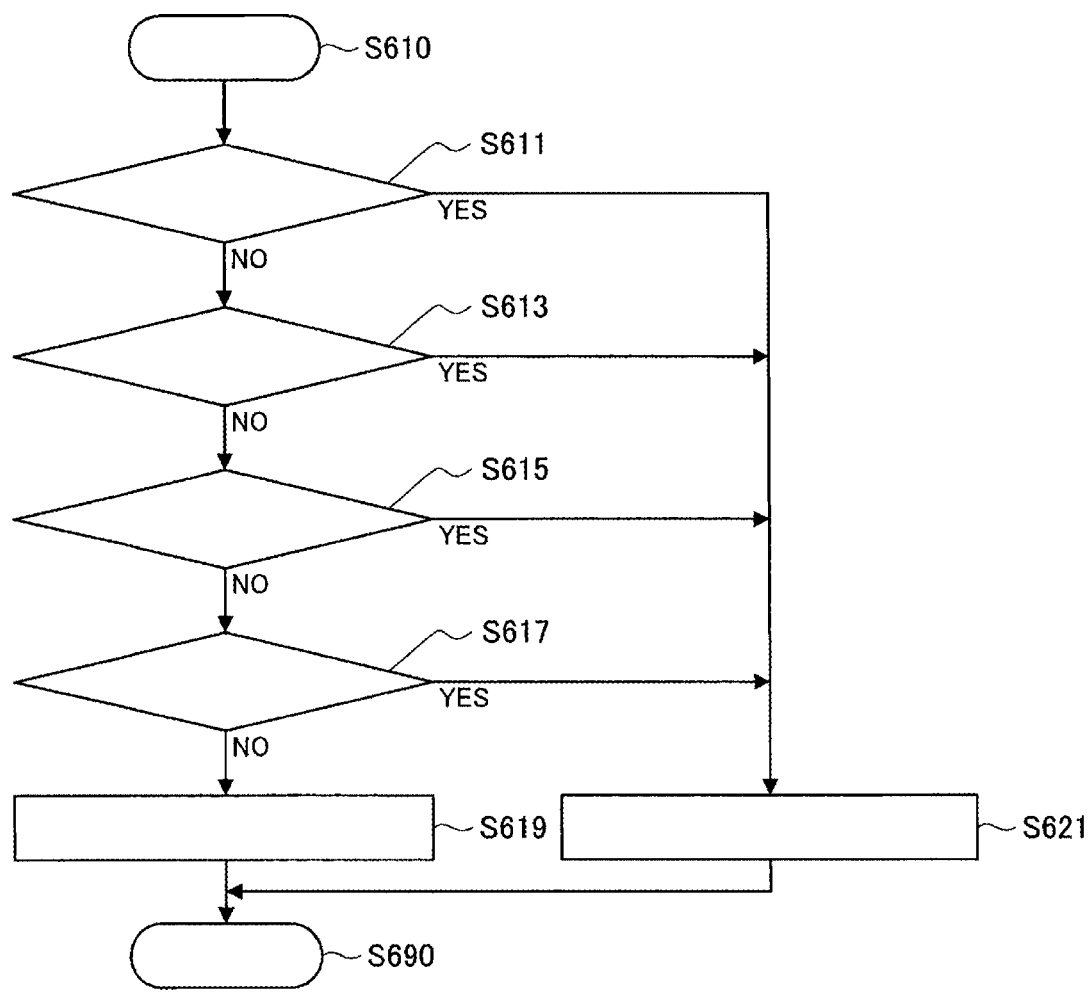
[FIG. 6]

CONTROLLER AND CONTROL METHOD

BACKGROUND OF THE INVENTION

The present disclosure relates to a controller and a control method capable of appropriately stabilizing a posture of a straddle-type vehicle.

Conventionally, a controller that controls a posture of a straddle-type vehicle to stabilize the posture of the straddle-type vehicle has been available. As such a controller, for example, as disclosed in JP-A-2013-173426, a controller that executes automatic posture control is available. In the automatic posture control, the posture of the straddle-type vehicle is controlled by increasing or reducing a rotational frequency of a wheel when the straddle-type vehicle jumps.

However, it cannot be said that a conventional technique such as the technique disclosed in JP-A-2013-173426 is sufficient for appropriate stabilization of the posture of the straddle-type vehicle. Thus, it is considered that the further appropriate stabilization of the posture of the straddle-type vehicle is desired. For example, in the technique disclosed in JP-A-2013-173426, there is a case where the automatic posture control is executed without a driver's intention when the straddle-type vehicle jumps. In such a case, it may be difficult to appropriately stabilize the posture of the straddle-type vehicle because the driver's operation is interrupted.

SUMMARY OF THE INVENTION

The present invention has been made with the above-described problem as the background and therefore obtains a controller and a control method capable of appropriately stabilizing a posture of a straddle-type vehicle.

Solution to Problem

A controller according to the present invention is a controller that controls a rotational frequency of a wheel of a straddle-type vehicle, includes: an acquisition section that acquires posture information at the time when the straddle-type vehicle jumps; and a control section that executes automatic posture control for controlling a posture of the straddle-type vehicle by increasing or reducing the rotational frequency of the wheel in accordance with the posture information acquired by the acquisition section when the straddle-type vehicle jumps, and further includes an intention determination section that determines whether a driver has intention to control the posture of the straddle-type vehicle at the time when the straddle-type vehicle jumps without relying on the automatic posture control. The control section prohibits the automatic posture control in the case where it is determined that the driver has the intention.

A control method according to the present invention is a control method for controlling a rotational frequency of a wheel of a straddle-type vehicle, includes: an acquisition step of acquiring posture information at the time when the straddle-type vehicle jumps; and a control step of executing automatic posture control by a controller when the straddle-type vehicle jumps, the automatic posture control controlling a posture of the straddle-type vehicle by increasing or reducing the rotational frequency of the wheel in accordance with the posture information acquired in the acquisition step, and further includes an intention determination step of determining whether a driver has intention to control the posture of the straddle-type vehicle at the time when the straddle-type vehicle jumps without relying on the automatic posture control. In the case where it is determined that the driver has the intention, the automatic posture control is prohibited in the control step.

Advantageous Effects of Invention

In the controller and the control method according to the present invention, when the straddle-type vehicle jumps, the automatic posture control for controlling the posture of the straddle-type vehicle by increasing or reducing the rotational frequency of the wheel is executed in accordance with the posture information at the time when the straddle-type vehicle jumps. Furthermore, it is determined whether the driver has the intention to control the posture of the straddle-type vehicle at the time when the straddle-type vehicle jumps without relying on the automatic posture control. In the case where it is determined that the driver has the intention, the automatic posture control is prohibited. In this way, the execution of the automatic posture control against the driver's intention can be prevented when the straddle-type vehicle jumps. Therefore, the posture of the straddle-type vehicle can appropriately be stabilized.

BRIEF DESCRIPTION OF DRAWINGS

FIG. 1 is a schematic view of a configuration of a motorcycle on which a controller according to an embodiment of the present invention is mounted.

FIG. 2 is an explanatory view for illustrating a pitch angle of the motorcycle.

FIG. 3 is an explanatory view for illustrating a roll angle of the motorcycle.

FIG. 4 is a block diagram of an exemplary functional configuration of the controller according to the embodiment of the present invention.

FIG. 5 is a flowchart illustrating an example of an overall processing flow that is executed by the controller according to the embodiment of the present invention.

FIG. 6 is a flowchart of an example of a processing flow for intention determination that is executed by the controller according to the embodiment of the present invention.

DETAILED DESCRIPTION

A description will hereinafter be made on a controller according to the present invention with reference to the drawings. Hereinafter, a description will be made on the controller used for a two-wheeled motorcycle. However, the controller according to the present invention may be used for a straddle-type vehicle other than the two-wheeled motorcycle (for example, a three-wheeled motorcycle, an all-terrain vehicle, a bicycle, or the like). The straddle-type vehicle means a vehicle that a driver straddles. In addition, a description will hereinafter be made on a case where an engine is mounted as a power output mechanism on the motorcycle, and the power output mechanism is a mechanism capable of outputting power to the motorcycle. However, a power output mechanism other than the engine (for example, a motor) may be mounted as the power output mechanism for the motorcycle thereon, or the multiple power output mechanisms may be mounted. For example, in the case where the motor is mounted as the power output mechanism for the motorcycle thereon, control of a rotational frequency of a wheel, which will be described below, is achieved by controlling the motor output.

A configuration, operation, and the like, which will be described below, merely constitute one example. The controller and the control method according to the present invention are not limited to a case with such a configuration, such operation, and the like.

The same or similar description will appropriately be simplified or will not be made below. In the drawings, the same or similar members or portions will not be denoted by a reference sign or will be denoted by the same reference sign. A detailed structure will appropriately be illustrated in a simplified manner or will not be illustrated.

<Configuration of Motorcycle>

A description will herein be made on a configuration of a motorcycle 100 on which a controller 30 according to an embodiment of the present invention with reference to FIG. 1 to FIG. 4.

FIG. 1 is a schematic view of a configuration of the motorcycle 100 on which the controller 30 is mounted. FIG. 2 is an explanatory view for illustrating a pitch angle of the motorcycle 100. FIG. 3 is an explanatory view for illustrating a roll angle of the motorcycle 100. FIG. 4 is a block diagram of an exemplary functional configuration of the controller 30.

As illustrated in FIG. 1, the motorcycle 100 includes: a trunk 1; a handlebar 2 that is held by the trunk 1 in a freely turnable manner; a front wheel 3 that is held by the trunk 1 in the freely turnable manner with the handlebar 2; a rear wheel 4 that is held by the trunk 1 in a freely rotatable manner; a front suspension 5; a rear suspension 6; an engine 7, and the controller (ECU) 30. The motorcycle 100 also includes an inertial measurement unit (IMU) 41, a front-wheel rotational frequency sensor 42, a rear-wheel rotational frequency sensor 43, a front stroke sensor 44, a rear stroke sensor 45, a throttle opening amount sensor 46, and a gear position sensor 47.

Each of the front suspension 5 and the rear suspension 6 is interposed between the trunk 1 and the wheel. More specifically, the front suspension 5 is provided on a front fork 8 that connects the handlebar 2 and the front wheel 3, and is extendable/contractable along an axial direction of the front suspension 5. The rear suspension 6 connects the trunk 1 and a swing arm 9 that is swingably supported by the trunk 1 and holds the rear wheel 4 in a freely turnable manner, and is extendable/contractable along an axial direction of the rear suspension 6.

The engine 7 corresponds to an example of the power output mechanism for the motorcycle 100 and outputs power for driving the wheels. More specifically, a crankshaft of the engine 7 is connected to an input shaft of a transmission mechanism, and an output shaft of the transmission mechanism is connected to the rear wheel 4. Thus, the power output from the engine 7 is transmitted to the transmission mechanism, is changed by the transmission mechanism, and is then transmitted to the rear wheel 4. Here, the crankshaft of the engine 7 and the input shaft of the transmission mechanism are connected via a clutch that connects/disconnects the power transmission.

The above clutch is engaged or disengaged in accordance with the driver's clutch operation (more specifically, an operation to grip a clutch lever on the handlebar 2). More specifically, the clutch is disengaged when the clutch operation is performed. In addition, in a state where the clutch operation is performed and the clutch is disengaged, a gear stage of the transmission mechanism is switched in accordance with the driver's shift lever operation.

For example, the engine 7 is provided with: one or multiple cylinders in each of which a combustion chamber is formed; a fuel injector that injects fuel into the combustion chamber; and an ignition plug. When the fuel is injected from the fuel injector, air-fuel mixture containing air and the fuel is produced in the combustion chamber, and the air-fuel mixture is then ignited by the ignition plug and burned. Consequently, a piston provided in the cylinder reciprocates to cause rotation of the crankshaft. A throttle valve is provided in an intake pipe of the engine 7, and an intake amount for the combustion chamber varies in accordance with a throttle opening amount as an opening degree of a throttle valve.

The output of the engine 7 is controlled by the controller 30, which will be described below, and is basically controlled in accordance with the driver's accelerator operation (more specifically, an operation to turn an accelerator grip on the handlebar 2). Note that, in the case where the driver's brake operation (more specifically, an operation to grip a brake lever on the handlebar 2) is performed, a braking force is applied to the wheel by a brake mechanism of the motorcycle 100.

The inertial measurement unit 41 includes a three-axis gyroscope sensor and a three-directional acceleration sensor, and is provided in the trunk 1, for example.

For example, the inertial measurement unit 41 detects the pitch angle and pitch angular acceleration of the motorcycle 100, and outputs a detection result. The inertial measurement unit 41 may detect another physical quantity that can substantially be converted to the pitch angle and the pitch angular acceleration of the motorcycle 100. For example, as illustrated in FIG. 2, the pitch angle corresponds to an angle $\theta 1$ that represents a tilt of the motorcycle 100 in a pitch direction with respect to a horizontal direction X. Hereinafter, a description will be made that the pitch angle obtains a positive value when a front side of the motorcycle 100 is lowered and that the pitch angle obtains a negative value when the front side of the motorcycle 100 is raised.

In addition, for example, the inertial measurement unit 41 detects the roll angle and roll angular acceleration of the motorcycle 100, and outputs a detection result. The inertial measurement unit 41 may detect another physical quantity that can substantially be converted to the roll angle and the roll angular acceleration of the motorcycle 100. For example, as illustrated in FIG. 3, the roll angle corresponds to an angle $\theta 2$ that represents a tilt of the motorcycle 100 in a rolling direction with respect to a vertical direction Y. Hereinafter, a description will be made on that the roll angle obtains a positive value when the motorcycle 100 is tilted in either direction of a vehicle right-left direction.

The front-wheel rotational frequency sensor 42 detects a rotational frequency of the front wheel 3 and outputs a detection result. The front-wheel rotational frequency sensor 42 may detect another physical quantity that can substantially be converted to the rotational frequency of the front wheel 3. The rear-wheel rotational frequency sensor 43 detects a rotational frequency of the rear wheel and outputs a detection result. The rear-wheel rotational frequency sensor 43 may detect another physical quantity that can substantially be converted to the rotational frequency of the rear wheel 4. The front-wheel rotational frequency sensor 42 and the rear-wheel rotational frequency sensor 43 are respectively provided on the front wheel 3 and the rear wheel 4, for example.

The front stroke sensor 44 detects a stroke amount of the front suspension 5 and outputs a detection result. The front stroke sensor 44 may detect another physical quantity that can substantially be converted to the stroke amount of the front suspension 5. The rear stroke sensor 45 detects a stroke amount of the rear suspension 6 and outputs a detection result. The rear stroke sensor 45 may detect another physical quantity that can substantially be converted to the stroke amount of the rear suspension 6. The front stroke sensor 44 and the rear stroke sensor 45 may respectively be provided on the front suspension 5 and the rear suspension 6, for example.

The throttle opening amount sensor 46 detects the throttle opening amount of the throttle valve in the engine 7 and outputs a detection result. The throttle opening amount sensor 46 may detect another physical quantity that can substantially be converted to the throttle opening amount of the throttle valve in the engine 7. The throttle opening amount sensor 46 may be provided in the engine 7, for example.

The gear position sensor 47 detects which gear stage the gear stage of the transmission mechanism in the motorcycle 100 is set to, and outputs a detection result. The gear position sensor 47 is provided in the transmission mechanism of the motorcycle 100, for example.

The controller 30 controls operation of a device mounted on the motorcycle 100, so as to control the rotational frequency of the wheel of the motorcycle 100. In this way, the controller 30 can control a posture of the motorcycle 100 at the time when the motorcycle 100 jumps.

For example, the controller 30 is partially or entirely constructed of a microcomputer, a microprocessor unit, or the like. In addition, the controller 30 may partially or entirely be constructed of a member in which firmware or the like can be updated, or may partially or entirely be a program module or the like that is executed by a command from a CPU or the like, for example. The controller 30 may be provided as one unit or may be divided into multiple units, for example. The controller 30 is attached to the trunk 1, for example.

As illustrated in FIG. 4, the controller 30 includes an acquisition section 310, a control section 320, and an intention determination section 330, for example.

The acquisition section 310 acquires information that is output from each of the devices mounted on the motorcycle 100, and outputs the acquired information to the control section 320 and the intention determination section 330. For example, the acquisition section 310 acquires the information that is output from each of the above-described sensors including the inertial measurement unit 41.

In particular, the acquisition section 310 acquires posture information that is information indicative of the posture of the motorcycle 100 at the time when the motorcycle 100 jumps. The posture information acquired by the acquisition section 310 is output to the control section 320, and automatic posture control, which will be described below, by the control section 320 is executed in accordance with the posture information. More specifically, as such posture information, the acquisition section 310 acquires the pitch angle or the pitch angular acceleration of the motorcycle 100.

The control section 320 outputs an operation instruction to the device such as the engine 7 mounted on the motorcycle 100, so as to control the rotational frequency of the wheel of the motorcycle 100.

For example, the control section 320 outputs the operation instruction to the engine 7 and controls the output of the engine 7 to control the rotational frequency of the rear wheel 4. For example, the control section 320 can control the output of the engine 7 by controlling the throttle opening amount of the throttle valve in the engine 7. At this time, the control section 320 uses the detection result of the throttle opening amount sensor 46 and thus can appropriately control the throttle opening amount of the throttle valve in the engine 7.

Note that the control section 320 may control the output of the engine 7 by controlling a control target other than the throttle opening amount (for example, a fuel injection amount, fuel injection timing, ignition timing, or the like). Alternatively, the control section 320 may control the output of the engine 7 by controlling the multiple control targets. The throttle valve in the engine 7 does not always have to be an electronically-controllable valve. The wheel that is driven by the engine 7 may not only be the rear wheel 4. For example, the front wheel 3 and the rear wheel 4 may be driven by the engine 7.

In particular, the control section 320 increases or reduces the rotational frequency of the wheel of the motorcycle 100 when the motorcycle 100 jumps. In this way, the control section 320 executes the automatic posture control for controlling the posture of the motorcycle 100 in accordance with the posture information at the time when the motorcycle 100 jumps that is acquired by the acquisition section 310.

Here, when the motorcycle 100 jumps, basically, an external force does not act on the motorcycle 100. Thus, angular momentum of the motorcycle 100 is conserved. For such a reason, in the case where the rotational frequency of the wheel is increased at the time when the motorcycle 100 jumps, torque in a reverse direction from a rotational direction of the wheel can act on a vehicle body. As a result, the posture of the motorcycle 100 can be controlled in a direction to raise the front side of the motorcycle 100. Accordingly, the automatic posture control is executed as described above in the case where there is a high possibility that, when the motorcycle 100 jumps, the motorcycle 100 contacts the ground in a state where the front side is excessively lowered, and rolls forward (hereinafter referred to as a forward roll tendency). As a result, a state where the motorcycle 100 is in the forward roll tendency can be canceled. Thus, the posture of the motorcycle 100 can be stabilized, and rolling thereof at the time of contacting the ground can be prevented.

Hereinafter, a description will be made on an example in which the control section 320 increases the rotational frequency of the wheel in the automatic posture control. However, in the automatic posture control, the control section 320 may reduce the rotational frequency of the wheel. For example, the control section 320 can reduce the rotational frequency of the wheel by reducing the output of the engine 7 or increasing the braking force generated on the wheel. In the case where the rotational frequency of the wheel is reduced at the time when the motorcycle 100 jumps, the torque in the same direction as the rotational direction of the wheel can act on the vehicle body. Thus, the posture of the motorcycle 100 can be controlled in a direction to lower the front side of the motorcycle 100. Accordingly, the automatic posture control is executed as described above in the case where there is a high possibility that, when the motorcycle 100 jumps, the motorcycle 100 contacts the ground in a state where the front side is excessively raised, and rolls backward (hereinafter referred to as a backward roll tendency). As a result, a state where the motorcycle 100 is in the backward roll tendency can be canceled. Thus, the posture of the motorcycle 100 can be stabilized, and rolling thereof at the time of contacting the ground can be prevented.

The intention determination section 330 determines whether the driver has intention to control the posture of the motorcycle 100 at the time when the motorcycle 100 jumps without relying on the automatic posture control (hereinafter also referred to as control intention). A determination result on the driver's control intention by the intention determination section 330 is output to the control section 320, and the control section 320 executes the automatic posture control in accordance with the determination result.

As described above, in the controller 30, the control section 320 executes the automatic posture control in accordance with the determination result on the driver's control intention by the intention determination section 330. More specifically, in the case where it is determined that the driver has the intention to control the posture of the motorcycle 100 at the time when the motorcycle 100 jumps without relying on the automatic posture control, the control section 320 prohibits the automatic posture control. In this way, the posture of the motorcycle 100 can appropriately be stabilized. Processing for such automatic posture control, which is executed by the controller 30, will be described later in detail.

<Operation of Controller>

A description will herein be made on operation of the controller 30 according to the embodiment of the present invention with reference to FIG. 5 and FIG. 6.

FIG. 5 is a flowchart of an example of an overall processing flow that is executed by the controller 30. More specifically, a control flow illustrated in FIG. 5 corresponds to a processing flow that is related to the automatic posture control among processing executed by the controller 30. In addition, the control flow illustrated in FIG. 5 is initiated in a state where the automatic posture control is not executed, and is thereafter repeatedly executed. Furthermore, while the control flow illustrated in FIG. 5 is executed, the acquisition section 310 keeps acquiring the information output from each of the sensors including the inertial measurement unit 41 that is mounted on the motorcycle 100, for example. Step S510 and step S590 in FIG. 5 respectively correspond to the initiation and termination of the control flow illustrated in FIG. 5.

When the control flow illustrated in FIG. 5 is initiated, in step S511, the control section 320 determines whether the motorcycle 100 jumps. If it is determined that the motorcycle 100 jumps (step S511/YES), the processing proceeds to step S513. On the other hand, if it is determined that the motorcycle 100 does not jump (step S511/NO), the control flow illustrated in FIG. 5 is terminated.

For example, the control section 320 determines whether the motorcycle 100 jumps on the basis of the stroke amount of the suspension in the motorcycle 100. More specifically, the control section 320 determines that the motorcycle 100 jumps in the case where each of the stroke amount of the front suspension 5 and the stroke amount of the rear suspension 6 is larger than a reference stroke amount. For example, the reference stroke amount is set to be a value with which it is possible to appropriately determine whether the stroke amount of each of the suspensions approximately corresponds to a stroke amount that is assumed in the case where vehicle body weight does not act on each of the suspensions. Note that the reference stroke amount that corresponds to the front suspension 5 and the reference stroke amount that corresponds to the rear suspension 6 may differ from each other.

In addition, for example, the control section 320 determines whether the motorcycle 100 jumps on the basis of a difference between the rotational frequency of the front wheel 3 and the rotational frequency of the rear wheel 4 (hereinafter also referred to as a rotational frequency difference between the front wheel 3 and the rear wheel 4). More specifically, the control section 320 determines that the motorcycle 100 jumps in the case where the rotational frequency difference between the front wheel 3 and the rear wheel 4 is larger than a reference difference. For example, the reference difference is set to be a value with which it is possible to appropriately determine whether the rotational frequency difference between the front wheel 3 and the rear wheel 4 approximately corresponds to the rotational frequency difference that is assumed when both of the front wheel 3 and the rear wheel 4 contact the ground.

Furthermore, for example, the control section 320 determines whether the motorcycle 100 jumps on the basis of the detection result of the inertial measurement unit 41. More specifically, the control section 320 can acquire acceleration in a vertical direction of the motorcycle 100 on the basis of the detection result of the inertial measurement unit 41. Accordingly, the control section 320 determines that the motorcycle 100 jumps in the case where it is determined that the acceleration in the vertical direction of the motorcycle 100 approximately corresponds to gravitational acceleration.

Note that the control section 320 may determine whether the motorcycle 100 jumps on the basis of a parameter other than the stroke amount of each of the suspensions, the rotational frequency difference between the front wheel 3 and the rear wheel 4, and the detection result of the inertial measurement unit 41. In addition, from a perspective of appropriately determining whether the motorcycle 100 jumps, the control section 320 preferably determines whether the motorcycle 100 jumps by using multiple parameters. For example, the control section 320 may determine that the motorcycle 100 jumps in the case where each of the stroke amount of the front suspension 5 and the stroke amount of the rear suspension 6 is larger than the reference stroke amount and where the rotational frequency difference between the front wheel 3 and the rear wheel 4 is larger than the reference difference.

In step S513, the control section 320 determines whether the gear stage of the transmission mechanism in the motorcycle 100 is the gear stage other than neutral. If it is determined that the gear stage of the transmission mechanism is the gear stage other than neutral (step S513/YES), the processing proceeds to step S515. On the other hand, if it is determined that the gear stage of the transmission mechanism is neutral (step S513/NO), the control flow illustrated in FIG. 5 is terminated.

For example, the control section 320 determines whether the gear stage of the transmission mechanism is the gear stage other than neutral on the basis of the detection result of the gear position sensor 47. Here, in the case where the gear stage of the transmission mechanism is neutral, the transmission mechanism is in such a state where the power transmission between the input shaft and the output shaft thereof is blocked. Thus, the power that is input from the engine 7 to the transmission mechanism is not transmitted to the rear wheel 4. On the other hand, in the case where the gear stage of the transmission mechanism is the gear stage other than neutral, the transmission mechanism is in such a state where the power is transmitted between the input shaft and the output shaft thereof. Thus, the power that is input from the engine 7 to the transmission mechanism is changed by a gear ratio corresponding to the gear stage of the transmission mechanism, and is then transmitted to the rear wheel 4.

In step S515, the control section 320 determines whether the posture information at the time when the motorcycle 100 jumps that is acquired by the acquisition section 310 is information indicative of the forward roll tendency of the motorcycle 100. If it is determined that the above posture information is the information indicative of the forward roll tendency of the motorcycle 100 (step S515/YES), the processing proceeds to step S517. On the other hand, if it is determined that the above posture information is not the information indicative of the forward roll tendency of the motorcycle 100 (step S515/NO), the control flow illustrated in FIG. 5 is terminated.

As described above, more specifically, as the posture information at the time when the motorcycle 100 jumps, the acquisition section 310 acquires the pitch angle or the pitch angular acceleration of the motorcycle 100. Accordingly, the control section 320 determines whether the pitch angle or the pitch angular acceleration at the time when the motorcycle 100 jumps that is acquired by the acquisition section 310 corresponds to the information indicative of the forward roll tendency of the motorcycle 100.

For example, in the case where the pitch angle is larger than a reference pitch angle, the control section 320 determines that the pitch angle corresponds to the information indicative of the forward roll tendency of the motorcycle 100. For example, the reference pitch angle is set to a positive value with which it is possible to appropriately determine whether the front side of the motorcycle 100 is lowered to such extent that it is estimated that the motorcycle 100 highly possibly contacts the ground in the state where the front side thereof is excessively lowered.

In addition, for example, in the case where the pitch angular acceleration is higher than reference pitch angular acceleration, the control section 320 determines that the pitch angular acceleration corresponds to the information indicative of the forward roll tendency of the motorcycle 100. For example, the reference pitch angular acceleration is set to a positive value with which it is possible to appropriately determine whether a posture change speed is high to such extent that it is estimated that the motorcycle 100 highly possibly contacts the ground in a state where the posture of the motorcycle 100 is changed in a direction to lower the front side thereof and the front side thereof is excessively lowered.

Furthermore, for example, in the case where the pitch angle is larger than the reference pitch angle and where the pitch angular acceleration is higher than the reference pitch angular acceleration, the control section 320 determines that the posture information including the pitch angle and the pitch angular acceleration is the information indicative of the forward roll tendency of the motorcycle 100.

In step S517, the intention determination section 330 determines whether the driver has the intention to control the posture of the motorcycle 100 at the time when the motorcycle 100 jumps without relying on the automatic posture control (that is, the control intention). If it is determined that the driver does not have the control intention (step S517/NO), the processing proceeds to step S519. On the other hand, if it is determined that the driver has the control intention (step S517/YES), the control flow illustrated in FIG. 5 is terminated.

Hereinafter, a detailed description will be made on an example of processing for the determination of whether the driver has the control intention by the intention determination section 330 (hereinafter also referred to as an intention determination) with reference to FIG. 6. FIG. 6 is a flowchart of an example of a processing flow for the intention determination that is executed by the controller 30. More specifically, a control flow illustrated in FIG. 6 corresponds to an example of the processing in step S517 of the control flow illustrated in FIG. 5. Step S610 and step S690 in FIG. 6 respectively correspond to initiation and termination of the control flow illustrated in FIG. 6.

When the control flow illustrated in FIG. 6 is initiated, first in step S611, the intention determination section 330 determines whether the driver's accelerator operation is detected. If it is determined that the driver's accelerator operation is not detected (step S611/NO), the processing proceeds to step S613. On the other hand, if it is determined that the driver's accelerator operation is detected (step S611/YES), the processing proceeds to step S621.

For example, the intention determination section 330 determines whether the driver's accelerator operation is detected on the basis of an operation amount during the driver's accelerator operation (more specifically, a turning amount of the accelerator grip on the handlebar 2). Note that, for example, the operation amount during the accelerator operation is output to the controller 30 from the handlebar 2 or another controller that acquires the operation amount, and the acquisition section 310 can acquire the operation amount.

In step S613, the intention determination section 330 determines whether the driver's brake operation is detected. If it is determined that the driver's brake operation is not detected (step S613/NO), the processing proceeds to step S615. On the other hand, if it is determined that the driver's brake operation is detected (step S613/YES), the processing proceeds to step S621.

For example, the intention determination section 330 determines whether the driver's brake operation is detected on the basis of an operation amount during the driver's brake operation (more specifically, a movement amount of the brake lever on the handlebar 2). Note that, for example, the operation amount during the brake operation is output to the controller 30 from the handlebar 2 or another controller that acquires the operation amount (for example, a controller that controls the brake mechanism), and the acquisition section 310 can acquire the operation amount.

In step S615, the intention determination section 330 determines whether the driver's clutch operation is detected. If it is determined that the driver's clutch operation is not detected (step S615/NO), the processing proceeds to step S617. On the other hand, if it is determined that the driver's clutch operation is detected (step S615/YES), the processing proceeds to step S621.

For example, the intention determination section 330 determines whether the driver's clutch operation is detected on the basis of an operation amount during the driver's clutch operation (more specifically, a movement amount of the clutch lever on the handlebar 2). Note that, for example, the operation amount during the clutch operation is output to the controller 30 from the handlebar 2 or another controller that acquires the operation amount, and the acquisition section 310 can acquire the operation amount.

In step S617, the intention determination section 330 determines whether the motorcycle 100 has a twisted tendency. If it is determined that the motorcycle 100 does not have the twisted tendency (step S617/NO), the processing proceeds to step S619. On the other hand, if it is determined that the motorcycle 100 has the twisted tendency (step S617/YES), the processing proceeds to step S621.

More specifically, the case where the motorcycle 100 has the twisted tendency corresponds to a case where the front wheel 3 is excessively twisted with respect to the vehicle body by the driver's operation using the handlebar 2 when the motorcycle 100 jumps or a case where the front wheel 3 is highly possibly twisted excessively with respect to the vehicle body in the future. In the case where the front wheel 3 is excessively twisted with respect to the vehicle body when the motorcycle 100 jumps, the posture of the motorcycle 100 is a posture to fall in the rolling direction. Just as described, the operation to excessively twist the front wheel 3 with respect to the vehicle body is the operation that is intentionally performed by the driver when the motorcycle 100 jumps.

For example, the intention determination section 330 determines whether the motorcycle 100 has the twisted tendency on the basis of the roll angle or roll angular acceleration of the motorcycle 100.

For example, in the case where the roll angle is larger than a reference roll angle, the intention determination section 330 determines that the motorcycle 100 has the twisted tendency. For example, the reference roll angle is set to a value with which it is possible to appropriately determine whether the motorcycle 100 falls in the rolling direction to the extent that is assumed when the driver performs the operation to excessively twist the front wheel 3 with respect to the vehicle body.

In addition, for example, in the case where the roll angular acceleration is higher than reference roll angular acceleration, the intention determination section 330 determines that the motorcycle 100 has the twisted tendency. For example, the reference roll angular acceleration is set to a value with which it is possible to appropriately determine whether the posture change speed is high to such extent that it is estimated that the posture of the motorcycle 100 is changed in the direction to fall in the rolling direction and the driver currently performs the operation to excessively twist the front wheel 3 with respect to the vehicle body.

Furthermore, for example, in the case where the roll angle is larger than the reference roll angle and the roll angular acceleration is higher than the reference roll angular acceleration, the intention determination section 330 may determine that the motorcycle 100 has the twisted tendency.

In step S619, the intention determination section 330 determines that the driver does not have the intention to control the posture of the motorcycle 100 at the time when the motorcycle 100 jumps without relying on the automatic posture control. On the other hand, in step S621, the intention determination section 330 determines that the driver has the intention to control the posture of the motorcycle 100 at the time when the motorcycle 100 jumps without relying on the automatic posture control.

After step S619 or step S621, the control flow illustrated in FIG. 6 is terminated.

The above description has been made on the example in which the determinations in steps S611, S613, S615, and S617 are made for the intention determination by the intention determination section 330. However, at least one of these determinations may not be made, or it may be determined that the driver has the control intention in the case where a condition other than YES in these determinations is established.

A description will hereinafter be made on the processing in step S519 onward of the control flow illustrated in FIG. 5.

In step S519, the control section 320 initiates the automatic posture control. As described above, the automatic posture control is the control of the posture of the motorcycle 100 by increasing or reducing the rotational frequency of the wheel of the motorcycle 100 at the time when the motorcycle 100 jumps.

More specifically, in the automatic posture control in step S519, the control section 320 increases the rotational frequency of the wheel of the motorcycle 100. In this way, the torque in the reverse direction from the rotational direction of the wheel can act on the vehicle body of the motorcycle 100. As a result, the posture of the motorcycle 100 can be controlled in the direction to raise the front side of the motorcycle 100.

For example, in the above automatic posture control, the control section 320 increases the output of the engine 7 so as to increase the rotational frequency of the rear wheel 4.

Here, from a perspective of appropriately controlling such behavior that the rotational frequency of the rear wheel 4 is increased, the control section 320 preferably determines an increased amount of the output of the engine 7 on the basis of the pitch angle or the pitch angular acceleration of the motorcycle 100. For example, in the case where the pitch angle is large, the control section 320 determines the increased amount of the output of the engine 7 to have a larger value than the case where the pitch angle is small. In addition, for example, in the case where the pitch angular acceleration is high, the control section 320 determines the increased amount of the output of the engine 7 to have the larger value than the case where the pitch angular acceleration is low. Note that the control section 320 may determine the increased amount of the output of the engine 7 on the basis of both of the pitch angle and the pitch angular acceleration of the motorcycle 100.

In addition, from the perspective of appropriately controlling such behavior that the rotational frequency of the rear wheel 4 is increased, the control section 320 preferably determines the increased amount of the output of the engine 7 on the basis of the gear ratio of the transmission mechanism in the motorcycle 100. For example, in the case where the gear ratio is small, the control section 320 determines the increased amount of the output of the engine 7 to have the larger value than the case where the gear ratio is large. Note that the control section 320 may determine the increased amount of the output of the engine 7 on the basis of the gear ratio of the transmission mechanism by using the detection result of the gear position sensor 47, for example.

Next, in step S521, the control section 320 determines whether reference duration has elapsed from a time point at which the motorcycle 100 starts jumping. If it is determined that the reference duration has not elapsed from the time point at which the motorcycle 100 starts jumping (step S521/NO), the processing proceeds to step S523. On the other hand, if it is determined that the reference duration has elapsed from the time point at which the motorcycle 100 starts jumping (step S521/YES), the processing proceeds to step S529.

For example, the reference duration is set to shorter duration than average duration that is assumed as duration during which the motorcycle 100 jumps.

In step S523, the control section 320 determines whether the posture information at the time when the motorcycle 100 jumps that is acquired by the acquisition section 310 is the information indicative of the forward roll tendency of the motorcycle 100. If it is determined that the above posture information is the information indicative of the forward roll tendency of the motorcycle 100 (step S523/YES), the processing proceeds to step S525. On the other hand, if it is determined that the above posture information is not the information indicative of the forward roll tendency of the motorcycle 100 (step S523/NO), the processing proceeds to step S529. Note that the processing executed by the control section 320 in step S523 is the same as the processing in above-described step S515, for example.

In step S525, the intention determination section 330 determines whether the driver has the intention to control the posture of the motorcycle 100 at the time when the motorcycle 100 jumps without relying on the automatic posture control. If it is determined that the driver does not have the control intention (step S525/NO), the processing proceeds to step S527. On the other hand, if it is determined that the driver has the control intention (step S525/YES), the processing proceeds to step S529. Note that the processing executed by the intention determination section 330 in step S525 is the same as the processing in above-described step S517, for example.

In step S527, the control section 320 determines whether the motorcycle 100 contacts the ground. If it is determined that the motorcycle 100 contacts the ground (step S527/YES), the processing proceeds to step S529. On the other hand, if it is determined that the motorcycle 100 does not contact the ground (step S527/NO), the processing returns to step S521.

For example, the control section 320 uses a similar method to a method used for the determination on whether the motorcycle 100 jumps in above-described step S511, so as to determine that the motorcycle 100 contacts the ground when it is determined that the motorcycle 100 does not jump, or to determine that the motorcycle 100 does not contact the ground when it is determined that the motorcycle 100 jumps.

In step S529, the control section 320 terminates the automatic posture control. At this time, more specifically, the control section 320 reduces the rotational frequency of the rear wheel 4 by reducing the output of the engine 7 to such output that corresponds to the driver's accelerator operation. In this way, the output of the engine 7 returns to the state of being controlled in accordance with the driver's accelerator operation.

Next, the control flow illustrated in FIG. 5 is terminated.

As described above, in the control flow illustrated in FIG. 5, in the case where the intention determination section 330 determines that the driver has the control intention before the automatic posture control is initiated (that is, the case where it is determined YES in step S517), the automatic posture control is not executed by the control section 320, and the control flow illustrated in FIG. 5 is terminated. In addition, in the case where the intention determination section 330 determines that the driver has the control intention after the automatic posture control is initiated (that is, the case where it is determined YES in step S525), the automatic posture control is interrupted by the control section 320, and the control flow illustrated in FIG. 5 is terminated. Just as described, in the case where it is determined that the driver has the intention to control the posture of the motorcycle 100 at the time when the motorcycle 100 jumps without relying on the automatic posture control, the control section 320 prohibits the automatic posture control.

In addition, as described above, in the control flow illustrated in FIG. 5, in the case where the gear stage of the transmission mechanism in the motorcycle 100 is neutral before the automatic posture control is initiated (that is, the case where it is determined NO in step S513), the automatic posture control is not executed by the control section 320, and the control flow illustrated in FIG. 5 is terminated. In this way, in the case where the transmission mechanism is in the state where the power transmission between the input shaft and the output shaft thereof is blocked, unnecessary fuel consumption caused by the execution of the automatic posture control can be prevented.

Furthermore, as described above, in the control flow illustrated in FIG. 5, in the case where the reference duration has elapsed from the time point at which the motorcycle 100 has started jumping after the automatic posture control is initiated (that is, the case where it is determined YES in step S521), the automatic posture control is interrupted by the control section 320, and the control flow illustrated in FIG. 5 is terminated. In this way, before the motorcycle 100 contacts the ground, the automatic posture control is interrupted, and the reduction in the rotational frequency of the rear wheel 4 can be completed. Thus, the behavior of the motorcycle 100 after the contact with the ground can further be stabilized.

The above description has been made on the example in which the control section 320 executes the automatic posture control in the case where the posture information of the motorcycle 100 at the time when the motorcycle 100 jumps is the information indicative of the forward roll tendency of the motorcycle 100. However, the control section 320 may execute the automatic posture control in the case where the posture information is information indicative of the backward roll tendency of the motorcycle 100. In the automatic posture control of such a case, the control section 320 reduces the rotational frequency of the wheel of the motorcycle 100. In this way, the torque in the same direction as the rotational direction of the wheel can act on the vehicle body of the motorcycle 100. As a result, the posture of the motorcycle 100 can be controlled in the direction to lower the front side of the motorcycle 100. In regard to the automatic posture control in which the rotational frequency of the wheel of the motorcycle 100 is lowered, just as described, the control section 320 also prohibits the automatic posture control in the case where it is determined that the driver has the intention to control the posture of the motorcycle 100 at the time when the motorcycle 100 jumps without relying on the automatic posture control.

<Effects of Controller>

A description will be made on effects of the controller 30 according to the embodiment of the present invention.

In the controller 30, when the motorcycle 100 jumps, the control section 320 executes the automatic posture control for controlling the posture of the motorcycle 100 by increasing or reducing the rotational frequency of the wheel of the motorcycle 100 in accordance with the posture information at the time when the motorcycle 100 jumps that is acquired by the acquisition section 310. Furthermore, the intention determination section 330 determines whether the driver has the intention to control the posture of the motorcycle 100 at the time when the motorcycle 100 jumps without relying on the automatic posture control (that is, the control intention). In the case where it is determined that the driver has the control intention, the control section 320 prohibits the automatic posture control. In this way, the execution of the automatic posture control against the driver's intention can be prevented when the motorcycle 100 jumps. Therefore, the posture of the motorcycle 100 can appropriately be stabilized.

In the controller 30, the intention determination section 330 preferably determines that the driver has the control intention in the case where the driver's accelerator operation is detected. Here, the driver performs the accelerator operation to increase the rotational frequency of the wheel when the motorcycle 100 jumps. In this way, the posture of the motorcycle 100 can be controlled in the direction to raise the front side of the motorcycle 100. For such a reason, when the motorcycle 100 jumps, the driver possibly performs the accelerator operation to cancel the state where the motorcycle 100 has the forward roll tendency, for example. Thus, in the case where it is determined that the driver has the control intention when the driver's accelerator operation is detected, the execution of the automatic posture control against the driver's intention can appropriately be prevented.

In the controller 30, the intention determination section 330 preferably determines that the driver has the control intention in the case where the driver's brake operation is detected. Here, the driver performs the brake operation to reduce the rotational frequency of the wheel when the motorcycle 100 jumps. In this way, the posture of the motorcycle 100 can be controlled in the direction to lower the front side of the motorcycle 100. For such a reason, when the motorcycle 100 jumps, the driver possibly performs the brake operation to cancel the state where the motorcycle 100 has the backward roll tendency, for example. Thus, in the case where it is determined that the driver has the control intention when the driver's brake operation is detected, the execution of the automatic posture control against the driver's intention can appropriately be prevented.

In the controller 30, the intention determination section 330 preferably determines that the driver has the control intention in the case where the driver's clutch operation is detected. As described above, when the motorcycle 100 jumps, the driver possibly performs the brake operation to cancel the state where the motorcycle 100 has the backward roll tendency. For example, in this case, the driver possibly performs the clutch operation to prevent occurrence of an engine stall that stops the engine 7. Thus, in the case where it is determined that the driver has the control intention when the driver's clutch operation is detected, the execution of the automatic posture control against the driver's intention can appropriately be prevented.

In the controller 30, the intention determination section 330 preferably determines that the driver has the control intention in the case where the motorcycle 100 is determined to have the twisted tendency. As described above, the operation to excessively twist the front wheel 3 with respect to the vehicle body is the operation that is intentionally performed by the driver when the motorcycle 100 jumps. Thus, in the case where it is determined that the driver has the control intention when it is determined that the motorcycle 100 has the twisted tendency, the execution of the automatic posture control against the driver's intention can appropriately be prevented.

In the controller 30, the intention determination section 330 preferably determines whether the motorcycle 100 has the twisted tendency on the basis of the roll angle or the roll angular acceleration of the motorcycle 100. As described above, in the case where the front wheel 3 is excessively twisted with respect to the vehicle body when the motorcycle 100 jumps, the posture of the motorcycle 100 is the posture to fall in the rolling direction. Thus, when the determination is made as described above, it is possible to appropriately determine whether the motorcycle 100 has the twisted tendency.

In the controller 30, the control section 320 preferably increases the rotational frequency of the wheel in the automatic posture control in the case where the posture information at the time when the motorcycle 100 jumps is the information indicative of the forward roll tendency of the motorcycle 100. In this way, the torque in the reverse direction from the rotational direction of the wheel can act on the vehicle body of the motorcycle 100. As a result, the posture of the motorcycle 100 can be controlled in the direction to raise the front side of the motorcycle 100. Thus, the state where the motorcycle 100 has the forward roll tendency can be canceled. Therefore, it is possible to stabilize the posture of the motorcycle 100 and thus to prevent falling at the time of contacting the ground.

In the controller 30, as the posture information at the time when the motorcycle 100 jumps, the acquisition section 310 preferably acquires the pitch angle or the pitch angular acceleration of the motorcycle 100. In this way, the control section 320 can execute the automatic posture control in accordance with the pitch angle or the pitch angular acceleration. Therefore, the automatic posture control for increasing the rotational frequency of the wheel can appropriately be executed when the motorcycle 100 has the forward roll tendency.

In the controller 30, the control section 320 preferably increases the rotational frequency of the wheel in the automatic posture control by increasing the output of the power output mechanism (for example, the engine 7) in the case where the posture information at the time when the motorcycle 100 jumps is the information indicative of the forward roll tendency of the motorcycle 100. In this way, in the automatic posture control, the rotational frequency of the wheel can appropriately be increased.

In the controller 30, the control section 320 preferably determines the increased amount of the output of the power output mechanism (for example, the engine 7) on the basis of the pitch angle or the pitch angular acceleration of the motorcycle 100 in the automatic posture control in the case where the posture information at the time when the motorcycle 100 jumps is the information indicative of the forward roll tendency of the motorcycle 100. In this way, in the automatic posture control, such behavior that the rotational frequency of the wheel is increased can appropriately be controlled in accordance with a degree of the forward roll tendency of the motorcycle 100.

In the controller 30, the control section 320 preferably determines the increased amount of the output of the power output mechanism (for example, the engine 7) on the basis of the gear ratio of the transmission mechanism in the motorcycle 100 in the automatic posture control in the case where the posture information at the time when the motorcycle 100 jumps is the information indicative of the forward roll tendency of the motorcycle 100. In this way, in the automatic posture control, such behavior that the rotational frequency of the wheel is increased can appropriately be controlled in accordance with the gear ratio of the transmission mechanism.

The description has been made so far on the embodiment. However, the present invention is not limited to the description of the embodiment. For example, the embodiment may only partially be implemented.

REFERENCE SIGNS LIST

1: Trunk
2: Handlebar
3: Front wheel
4: Rear wheel
5: Front suspension
6: Rear suspension
7: Engine
8: Front fork
9: Swing arm
30: Controller
41: Inertial measurement unit
42: Front-wheel rotational frequency sensor
43: Rear-wheel rotational frequency sensor 44: Front stroke sensor
45: Rear stroke sensor
46: Throttle opening amount sensor
47: Gear position sensor
100: Motorcycle
310: Acquisition section
320: Control section
330: Intention determination section

The invention claimed is:

1. A controller that controls a rotational frequency of a wheel of a straddle-type vehicle, the controller comprising:
an acquisition section that acquires posture information at a time when the straddle-type vehicle jumps; and
a control section that executes automatic posture control for controlling a posture of the straddle-type vehicle by increasing or reducing the rotational frequency of the wheel in accordance with the posture information acquired by the acquisition section when the straddle-type vehicle jumps, and further comprising:
an intention determination section that determines whether a driver has intention to control the posture of the straddle-type vehicle at the time when the straddle-type vehicle jumps without relying on the automatic posture control, wherein the control section prohibits the automatic posture control in the case where it is determined that the driver has the intention.

2. The controller according to claim 1, wherein the intention determination section determines that the driver has the intention in the case where the driver's accelerator operation is detected.

3. The controller according to claim 1, wherein the intention determination section determines that the driver has the intention in the case where the driver's brake operation is detected.

4. The controller according to claim 1, wherein the intention determination section determines that the driver has the intention in the case where the driver's clutch operation is detected.

5. The controller according to claim 1, wherein the intention determination section determines that the driver has the intention in the case where the straddle-type vehicle has a twisted tendency.

6. The controller according to claim 5, wherein the intention determination section determines whether the straddle-type vehicle has the twisted tendency on the basis of a roll angle or roll angular acceleration of the straddle-type vehicle.

7. The controller according claim 1, wherein the control section increases the rotational frequency of the wheel in the automatic posture control in the case where the posture information is information indicative of a forward roll tendency of the straddle-type vehicle.

8. The controller according to claim 7, wherein the acquisition section acquires a pitch angle or pitch angular acceleration of the straddle-type vehicle as the posture information.

9. The controller according to claim 7, wherein the straddle-type vehicle includes a power output mechanism that outputs power for driving the wheel, and the control section increases the rotational frequency of the wheel by increasing output of the power output mechanism in the automatic posture control in the case where the posture information is the information indicative of the forward roll tendency of the straddle-type vehicle.

10. The controller according to claim 9, wherein the control section determines an increased amount of the output of the power output mechanism on the basis of the pitch angle or the pitch angular acceleration of the straddle-type vehicle in the automatic posture control in the case where the posture information is the information indicative of the forward roll tendency of the straddle-type vehicle.

11. The controller according to claim 9, wherein the control section determines the increased amount of the output of the power output mechanism on the basis of a gear ratio of a transmission mechanism in the straddle-type vehicle in the automatic posture control in the case where the posture information is the information indicative of the forward roll tendency of the straddle-type vehicle.

12. A control method for controlling a rotational frequency of a wheel of a straddle-type vehicle, the control method comprising:
an acquisition step of acquiring posture information at a time when the straddle-type vehicle jumps; and
a control step of executing automatic posture control by a controller when the straddle-type vehicle jumps, the automatic posture control controlling a posture of the straddle-type vehicle by increasing or reducing the rotational frequency of the wheel in accordance with the posture information acquired in the acquisition step, and further comprising:
an intention determination step of determining whether a driver has intention to control the posture of the straddle-type vehicle at the time when the straddle-type vehicle jumps without relying on the automatic posture control, wherein in the case where it is determined that the driver has the intention, the automatic posture control is prohibited in the control step in the case where it is determined that the driver has the intention, the automatic posture control is prohibited in the control step.

* * * * *